(12) United States Patent
Trainin

(10) Patent No.: US 8,537,795 B2
(45) Date of Patent: Sep. 17, 2013

(54) METHOD, APPARATUS AND SYSTEM FOR FORWARDING FRAME IN WIRELESS COMMUNICATION SYSTEMS

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 12/566,287

(22) Filed: Sep. 24, 2009

(65) Prior Publication Data

US 2011/0026505 A1    Feb. 3, 2011

Related U.S. Application Data

(60) Provisional application No. 61/229,070, filed on Jul. 28, 2009.

(51) Int. Cl.
*H04W 4/00* (2009.01)
(52) U.S. Cl.
USPC ........... 370/338; 370/401; 370/432; 370/392; 370/315; 455/11.1; 455/452.2; 455/16
(58) Field of Classification Search
None
See application file for complete search history.

(56) References Cited

U.S. PATENT DOCUMENTS

| | | | |
|---|---|---|---|
| 5,907,540 A | 5/1999 | Hayashi | |
| 6,987,770 B1 * | 1/2006 | Yonge, III | 370/401 |
| 7,330,457 B2 * | 2/2008 | Panwar et al. | 370/338 |
| 7,792,108 B2 * | 9/2010 | Livet et al. | 370/390 |
| 2002/0137459 A1 * | 9/2002 | Ebata et al. | 455/16 |
| 2004/0235489 A1 * | 11/2004 | Kwon | 455/452.2 |
| 2005/0076317 A1 | 4/2005 | Ling et al. | |
| 2005/0276317 A1 | 12/2005 | Jeong et al. | |

(Continued)

FOREIGN PATENT DOCUMENTS

| | | |
|---|---|---|
| CN | 1575027 A | 2/2005 |
| CN | 101076967 A | 11/2007 |
| JP | 8-97821 | 4/1996 |
| JP | 2003-169081 | 6/2003 |

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™-2007 (Revision of IEEE Std 802.11-1999 ).

(Continued)

*Primary Examiner* — Ian N Moore
*Assistant Examiner* — Brian T Le
(74) *Attorney, Agent, or Firm* — Shichrur & Co.

(57) ABSTRACT

A wireless communication device, system and a method of forwarding frames between stations of a wireless communication system are disclosed. The wireless communication system includes a sending station, a forwarding station and a receiving station. The sending station is able to send a frame including a forwarding field, a receiving station address field, a sending station address field and a forwarding station address field. The forwarding station is able to receive said frame and to forward the frame as is to the receiving station. The receiving station upon receiving the frame reads the forwarding field and if the forwarding field indicates that the frame has been forward from the sending station, the receiving station exchanges the address of the sending station with the address of the receiving station and the address of the receiving station with the address of the sending station and sends a block acknowledge frame including exchanged addresses to the sending station via the forwarding station.

21 Claims, 3 Drawing Sheets

(56) References Cited

U.S. PATENT DOCUMENTS

| | | | |
|---|---|---|---|
| 2006/0020735 A1* | 1/2006 | Barrenscheen | 710/305 |
| 2006/0126617 A1 | 6/2006 | Cregg et al. | |
| 2007/0104199 A1* | 5/2007 | Taha | 370/392 |
| 2007/0178932 A1* | 8/2007 | Miklos et al. | 455/525 |
| 2007/0258405 A1 | 11/2007 | Kim et al. | |
| 2008/0130673 A1* | 6/2008 | Cregg et al. | 370/432 |
| 2008/0165776 A1* | 7/2008 | Tao et al. | 370/392 |
| 2009/0011705 A1* | 1/2009 | Taori et al. | 455/39 |
| 2009/0190522 A1* | 7/2009 | Horn et al. | 370/315 |
| 2009/0213779 A1* | 8/2009 | Zhang et al. | 370/315 |

OTHER PUBLICATIONS

IEEE P802.11n™/D2.00 Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment <number>: Enhancements for Higher Throughput, IEEE P802.11n/D2.00, Feb. 2007.

802.15.3TM IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs), IEEE Std 802.15.3™-2003.

WiGig MAC and PHY Specification, Version 1.0, Apr. 2010.

International Search Report for PCT/US2010/041781 mailed on Feb. 24, 2011.

International Preliminary Report on Patentability and Written Opinion Received for PCT Patent Application No. PCT/US2010/041781, Mailed on Feb. 9, 2012, 6 pages.

Office Action for Chinese Patent Application No. 201010239419.4 mailed on Mar. 7, 2013; 20 pages (12 pages of English translation).

Office Action for Japanese Patent Application No. 2012-517930 mailed on Apr. 9, 2013; 6 pages (3 pages of English translation).

* cited by examiner

METHOD, APPARATUS AND SYSTEM FOR FORWARDING FRAME IN WIRELESS COMMUNICATION SYSTEMS

This application claims priority from U.S. provisional application No. 61/229,070 filed Jul. 28, 2009, incorporated by reference herein in its entirety.

BACKGROUND OF THE INVENTION

A personal wireless area network (WPAN) is a network used for communication among computing devices (for example, personal devices such as telephones and personal digital assistants) close to one person (the devices may or may not belong to that person). The reach of a WPAN may be for example a few meters. WPANs may be used for example for interpersonal communication among personal devices themselves, or for connecting via an uplink to a higher level network, for example the Internet.

The WEE 802.15.3 Task Group 3c (TG3c) was formed in March 2005. TG3c is developing a millimeter-wave (mmWave) based alternative physical layer (PHY) for the existing 802.15.3 Wireless Personal Area Network (WPAN) Standard e.g., IEEE 802.15.3-2003. This mmWave WPAN may operate in a band including the 57-64 GHz unlicensed band defined by FCC 47 CFR 15.255 and other regulatory bodies and may be referred to as "60 GHz". The millimeter-wave WPAN may allow very high data rate (e.g., over 2 Gigabit per second (Gbps)) applications such as high speed Internet access, streaming content download (e.g., video on demand, high-definition television (HDTV), home theater, etc.), real time streaming and wireless data bus for cable replacement.

However, a mmWave communication link is significantly less robust than links operating at lower frequencies (e.g. 2.4 GHz and 5 GHz bands) due to the Friis transmission equation, oxygen absorption and high attenuation through obstructions. In addition, the mmWave communication link may use a directional antenna and/or antennas array to increase the communication range. The use of a directional antenna makes a link very sensitive to mobility. For example, a slight change in the orientation of the device or the movement of a nearby object and/or person may disrupt the link.

In mmWave network forwarding data frames from a sending station to a receiving station by a forwarding station may consume a lot of memory resources and computing resources in order to forward the data frames to the receiving station and to provide block acknowledge frame to the sending station.

For example, the forwarding station may need to convert the address of the station and to encrypt or decrypt the data frame if desired. For example, if the data from the source station (STA) A to the destination STA B is delivered using the BSS services provided by Forwarding STA (Forw STA) then the Forw STA may be first delivered from the STA A to the Forw STA and then the Forw STA may deliver it to the destination STA B. The point to point approach implies that a STA may send a frame to the Forw STA with the Forw address in the first address field (e.g., Addr1) and the STA B address in the second address field (e.g., Addr 3). The frame sent by STA A may be acknowledged by Forw STA, if desired.

In the WiFi networks of mmWave spectrum like 60 MHz the propagation distance is short due to small size of antennas, therefore forwarding of frames may provide solution to extend the propagation distance. The problem of the known point to point based mechanism of forwarding is that it needs substantial amount of memory and processing time to be spent in the forwarding station which may further consume a lot of battery power.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
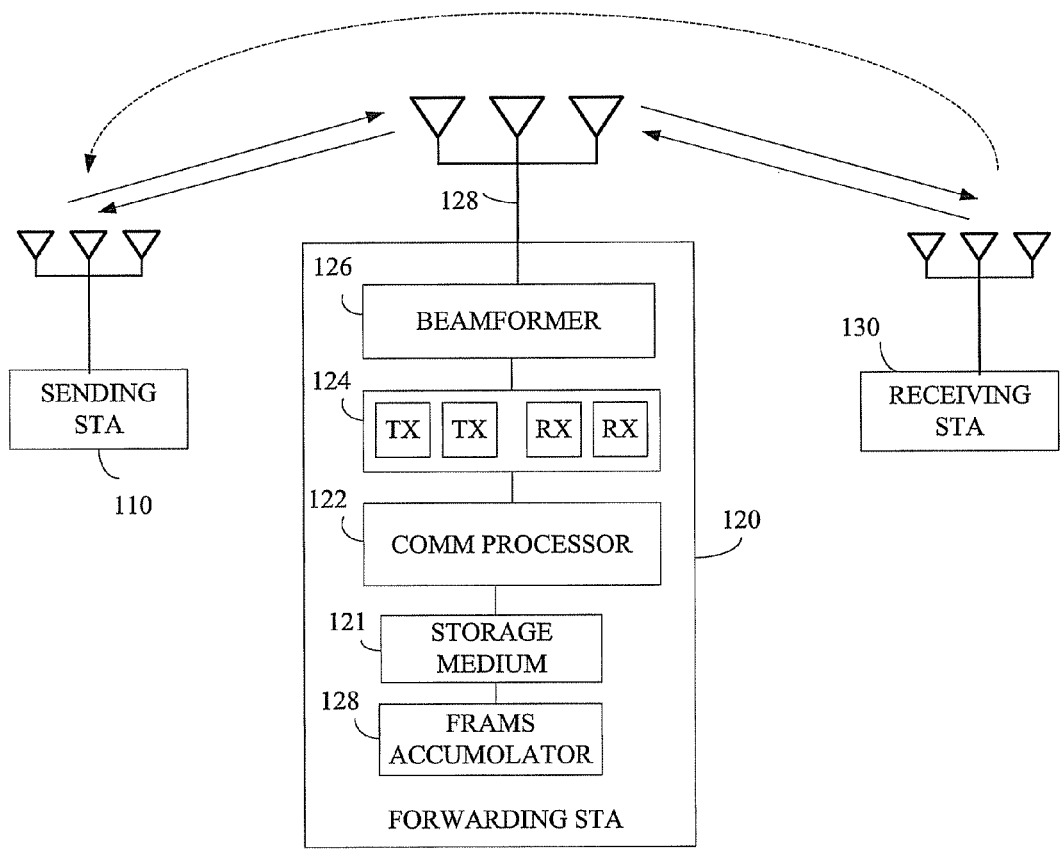
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The teinis "a" or "an", as used herein, are defined as one, or more then one. The term plurality, as used herein, is defined as two, or more than two. The term another, as used herein is defined as at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of a wireless communication network 100, according to exemplary embodiments of the invention is shown. Wireless communication network 100 may include for example, a WPAN/WLAN. For example, wireless communication network 100 may operate according to the standard developed by the IEEE 802 802.11 Task Group ad (TGad). TGad is developing Enhancements for Very High Throughput in the 60 GHz Band for WLAN.

According to this exemplary embodiment of the invention, wireless communication network 100, for example a 60 GHz WPAN, may include a sending station (STA) 110, a forwarding STA 120, and a receiving STA 130. Sending STA 110, forwarding STA 120 and receiving STA 130 may include similar components as described with forwarding STA 120. For example forwarding STA 120 may include a communication processor 122, a transceiver 124, a beamformer 126 and a one or more antennas 128. Communication processor 122 may include or may be coupled to a storage medium 121 and a frame accumulator to accumulate frames intended to be forward to receiving STA 130, if desired.

For example, communication processor 122 may be any processor that capable of executing instructions to operate and/or control wireless communication devices according to embodiments of the present invention (e.g., 60 GHz WPAN medium access controller (MAC)). Transceiver 124 may include plurality of transmitters (TX) and a plurality of receivers (RX). Antenna 128 may include a dipole antenna, an antenna array, an internal antenna, a one pole antenna or the like. It should be understood that the description of forwarding STA A 120 may be relevant to the description of sending STA 110 and receiving STA 130, although the scope of the present invention is not limited in this respect.

In operation, sending STA 110 may send data such as for example, a frame to receiving STA 130 via forwarding STA 120. For example, a frame may include at least a forwarding field, a receiving station address field, a sending station address field and forwarding station address field. Forwarding STA 120 may receive the frame and may forward the frame, as is, to the receiving STA 130. The forwarding STA 120 may identify the received frame as a frame to be forward by detecting the forwarding field being set to "1" (other values may be used) and the $3^{rd}$ address field content of the received frame is equal to the address of forwarding STA. After successful receipt of the frame (CRC OK) it forwards the frame as is. The term "successful receipt of the frame" is generally understood by artisans to mean that the content of a Cyclic Redundancy Check (CRC) field of the received frame equals the calculated CRC, although the scope of the present invention is not limited in this respect.

Receiving STA 130, upon receiving the frame, may read the forwarding field and if the forwarding field indicates that the frame has been forward from sending STA 110 sending STA 130 may exchange the address of the sending station with the address of the receiving station and/or the address of the receiving station with the address of the sending station and may send a block acknowledge (BA) frame with the exchanged address to the sending STA 110 via the forwarding STA 120, although the scope of the present invention is not limited to this example.

Furthermore one or more receivers of receiving STA 130 may receive another frame (e.g., one or more receivers of transceiver 124), and may identify the other frame as duplicate frame if a sequence number and a packet number of this frame are the same as a sequence number and a packet number of a first received frame. Receiving STA 130 may delete the duplicate frame. For example, the station processor (e.g., communication processor 122) may delete the duplicate frame if desired.

Figure 2:
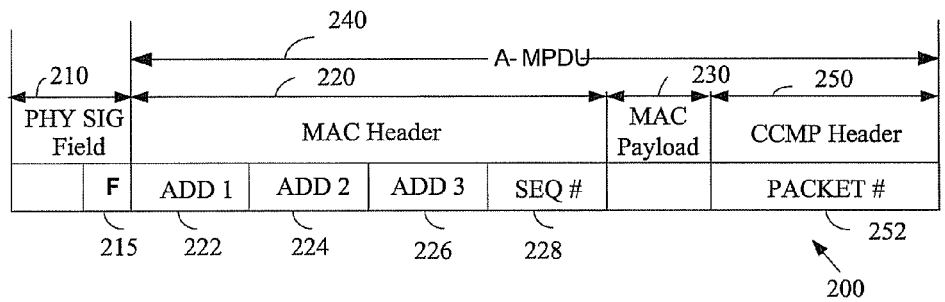
FIG. 2 is a schematic illustration of a frame, according to exemplary embodiment of the invention.

Turning to FIG. 2 a schematic illustration of a frame 200, according to an exemplary embodiment of the invention is shown. Although the scope of the present invention is not limited in this respect, the frame may include a physical signal (PHY SIG) field 210, a MAC header 220, a MAC Payload 230, a Chipper block with Chaining Message authentication code Protocol (CCMP) header 250 and other fields if desired. MAC header 220, MAC Payload 230, CCMP header 250 and the other fields may be a part of an aggregate message protocol data unit (A-MPDU) 240. PHY SIG field 210 may include a forwarding (F) field 215. MAC header field 220 may include for example, an Address 1 field 222, an Address 2 field 224, an Address 3 field 226, a sequence number 228, and a header 250 may include a packet number field 252, if desired.

According to embodiments of the invention, the F field may indicate forwarding the frame when set to "1" and not to forwarding the frame when set to "0" (other values may be used), MAC header 220 may include Address 1 field 222 that may include the address of the receiving STA (e.g., receiving STA 130, Address 2 field 224 that may include the address of the sending station (e.g., sending station 110), Address 3 field 226 that may include the forwarding STA address e.g., forwarding STA 120) and sequence number 228, if desired. CCPM CCMP header 250 may include packet number 252. Sequence number 228 and packet number 252 may be used to identify a another received frame as duplicate frame if sequence number 228 and a packet number 252 are the same as the sequence number and the packet number of a first received frame (e.g., the forwarded frame), although the scope of the present invention is not limited to this example or this frame structure.

Figure 3:
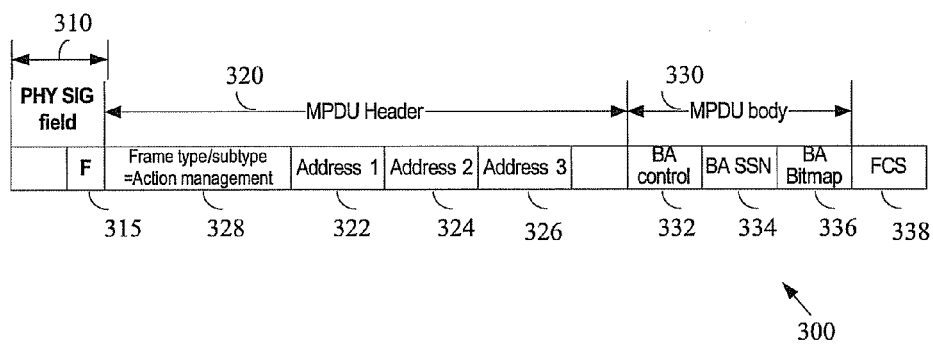
FIG. 3 is a schematic illustration of a block acknowledgment frame, according to exemplary embodiments of the invention.

Turning to FIG. 3 a schematic illustration of a block acknowledgment (BA) frame 300, according to exemplary embodiments of the invention, is shown. According to this example, BA frame 300 may be a management action frame type (also known in the art as a control frame) that may allow using the three addresses of frame 200. BA frame 300 may include a physical signal (PHY SIG) field 310 which includes a F field 315, a MAC header 320 that may include for example, an Address 1 322 field, an Address 2 field 324, an Address 3 field 326 and a frame type field 328. The exemplary BA frame 300 further includes an MPDU body 330 that may include a BA control field 332, a BA starting sequence number (SSN) field 334, a BA bitmap field 336 and a frame check sequence (FCS) field 338, although it should be understood that embodiments of the invention are not limited to this exemplary BA frame structure.

Figure 4:
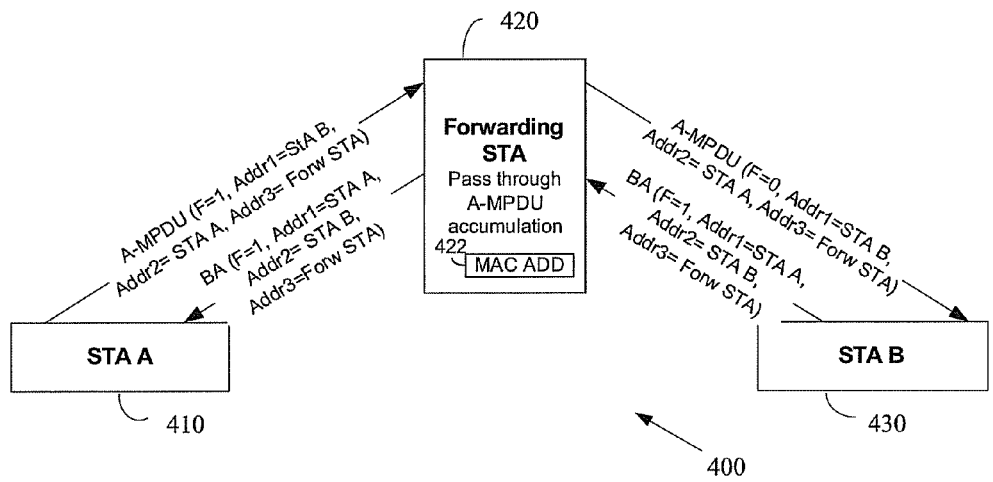
FIG. 4 is a schematic illustration of a WPAN system (e.g. a 60 GHz system) according to exemplary embodiment of the present invention.

Turning to FIG. 4, a WPAN system 400 (e.g., a 60 GHz system) according to exemplary embodiment of the present invention is shown. 60 GHz WPAN system 400 may include a station A (STA A) 410, a forwarding STA 420 and a STA B 430. According to this exemplary 60 GHz WPAN system 400, STA A 410 may act as a sending STA that may forward a frame (e.g., for example the frame of FIG. 2) to STA B 430 that may act as a receiving STA, through forwarding STA 420.

According to this example, STA A 410 may set field F of frame 200 to "1" (other values may used) and may assert in the address fields (e.g., address fields 222, 224 and 226 of frame 200) Addr1=STA B, Addr2=STA A and Addr3=Forw STA and may transmit the frame to forwarding STA 420, if desired. When Forwarding STA 420 receives the frame with the field F=1, forwarding STA 420 may compare the Addr3 (e.g., address field 226) with the Forwarding STA MAC address 422. If the Addr3 is equal to the forwarding STA 420 own MAC address 422, the Forwarding STA 420 may accumulate the received frame for example, in frame accumulator 128 (see FIG. 1) and then transmits the frame without any changes (e.g., as is). STA B 430 may receive the frame as any other regular frame. The way that STA B treats the frame in this example is not different from the way STA B 430 may treat frames transmitted directly by STA A 410 to STA B 430, although the scope of the present invention is not limited to this example.

According to one example, the receiving station (e.g., STA B 430) receiver may receive the forwarded frame (e.g., frame 200) twice, directly from sending station (e.g., STA A 410) and from forwarding STA 420. In this scenario, the receiving station receiver is able to identify one of the frames as a duplicate frame by comparing the sequence number and the packet number of the frames to each other. For example, if the sequence number and the packet number of one frame are the same as the sequence number and the packet number of the other frame, it may be declared to be a duplicate frame. A processor of the receiving station may delete the duplicate frame, although the scope of the present invention is not limited to this example. It should be understood that other components and/or modules of the receiving station may perform the operation of deletion of duplicate frames, if desired.

According to another example, an acknowledge (ACK) frame may be used to acknowledge receiving the forwarded frame (e.g., frame 200), if desired. The ACK frame may not be forwarded and may be transmitted directly to STA A 410 in a short interface space (SIFS) time after STA B 430 successfully received the forwarded frame.

Some embodiments of the present invention provide a solution for the delayed Block Ack (BA) acknowledgement mechanism to allow forwarding of the BA frame as well. The BA mechanism may be used when the MPDUs are aggregated inside A-MPDU 240, although the scope of the present invention is not limited to this example.

According to one exemplary embodiment of the invention, STA A 410 may forward the A-MPDU 240 with the F=1 (FIG. 2) as described above. STA B 430 may use BA frame 300 to acknowledge the successfully received MPDUs. The address-ing convention and the usage of the F field is the similar as for the addressing convention of a data frame (e.g., frame 200).

According to another embodiment of the invention, forwarding frames may be committed in a TDMA environment, and the service period allocation request and response as well the schedule of transmissions may be modified. The indication of forwarding and the STA ID of the forwarding STA may be appended in a time allocation request frame, if desired.

Figure 5:
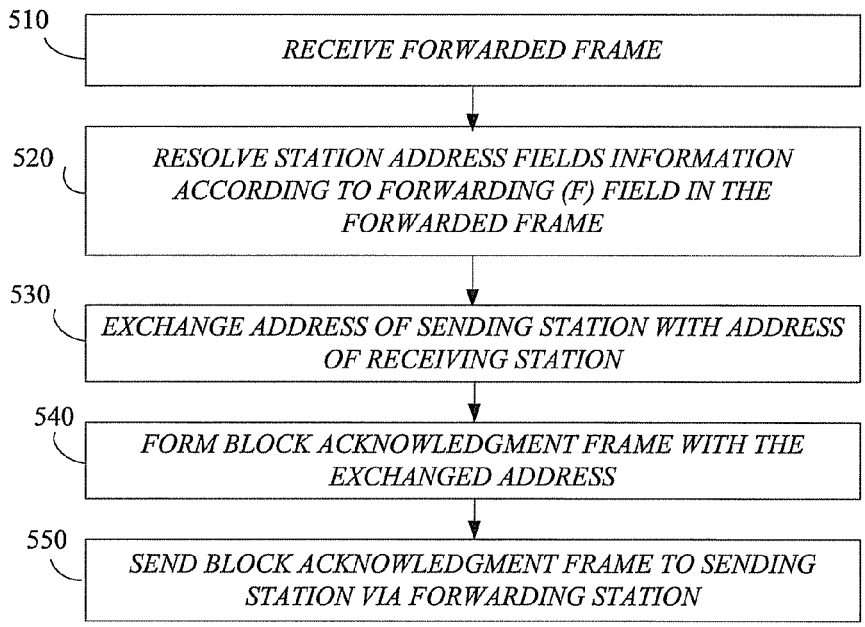
FIG. 5 is a schematic illustration of flowchart of a method of forwarding a frame according to some exemplary embodiments of the invention.

Turning to FIG. 5, a schematic illustration of flowchart of a method of forwarding a frame according to some exemplary embodiments of the invention is shown. Although the scope of the present invention is not limited in this respect, a receiving station (e.g., STA B 430) may receive a forwarded frame (e.g., frame 200) from forwarding STA (text block 510). Receiving STA may resolve the address fields (e.g., fields 222, 224 and 226) according to the information in the forwarding field (e.g., F field 215 equal to "1") of the forwarded frame (text block 520). If the F field indicates that the frame is a forwarded frame, the receiving STA may exchange the address of the sending station with the address of the receiving station in the BA frame (e.g., BA frame 300 and address fields 322, 334 and 336) as is shown with text block 540. The receiving STA may send the BA frame to the sending STA via forwarding STA (text block 550), although the scope of the present invention is not limited to this exemplary embodiment.

Embodiments of the present invention may include the following features: the forwarding field (F) in the PHY Signal field may indicate the received frame may be forwarded if the address 3 of the frame is equal to the forwarder MAC address. The forwarding STA may keep the address fields unchanged. The forwarding STA may keep the encryption and all related fields (IV) unchanged hence no resources have to be spent for decryption/encryption. A secure link which may be established between peer STAs may be used without any changes of the forwarding frame. Thus there may be no need to establish a secure link from the sending STA to the forwarding STA. A modified delayed BA may provide a peer to peer acknowledge solution by transmitting BA frame 300 to acknowledge the successfully received MPDUs. The data frames, the aggregated data frames and a Block Acknowledgment Request management frame (BAR) and BA action frames may be passed trough by the forwarding STA. The forwarding STA may not have to provide acknowledgment, reordering and retransmission functions, hence no resources have to be spent for those functions. Modification to include the F field allows forwarding of "Add Block Ack" (ADDBA) action frames as well as any other action frames. With some embodiments of the invention, the ADDBA management action frame may be used to establish an agreement to use Block Ack acknowledgement between STA A and STA B.

Figure 6:
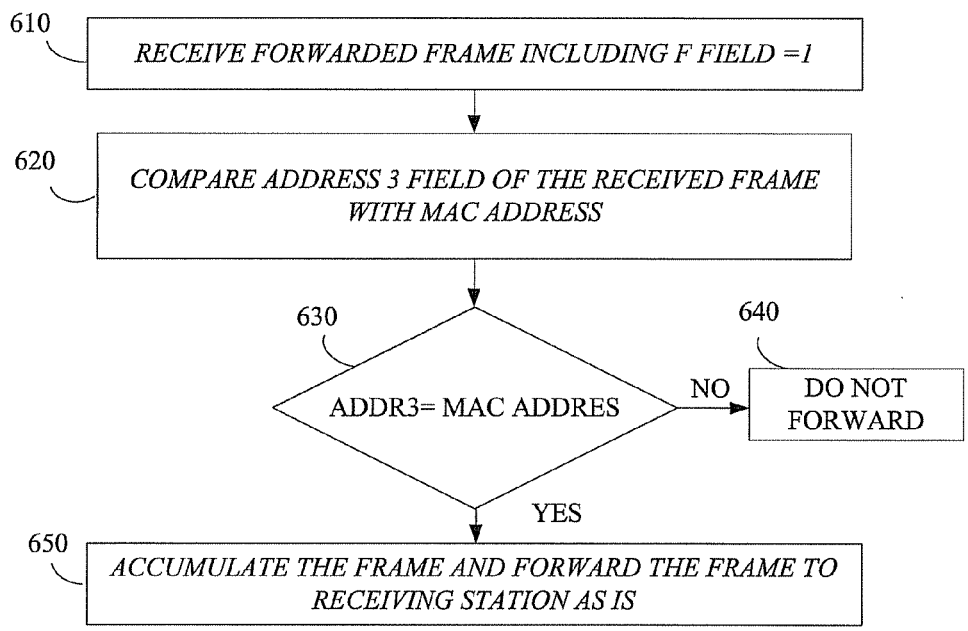
FIG. 6 is a flowchart of a method of forwarding a frame at a forwarding station according to exemplary embodiment of the invention.

In addition, forwarding of the frame is important to enable data transfer between STA A and STA B. The BA frame is of action management frame type that allows secure protection. The BA frame may allow allocation of the Service Period (SP) to allow the forwarding STA to transmit in the SP allocated by the source STA. With some embodiments of the invention stations may forward frames with no need to support security schemes and BA. For example, some frames may allow of including identification of the forwarding STA in the SP scheduling information to allow the forwarding STA to transmit in the time allocated by the sending STA Turning to FIG. 6, a flowchart of a method of forwarding a frame at a forwarding station according to exemplary embodiment of the invention is shown. Although the scope of the present invention is not limited in this respect, the forwarding station (e.g. forwarding STA 420) may receive receives a frame with the forwarding (F) field (e.g. F field 215)=1 (text box 610). Forwarding STA may compare the address of Addr3 Field of the receiving frame (e.g., address field 226) with the Forwarding STA MAC address (e.g. MAC address 422) as is shown in text box 620. If the address within Addr3 field is equal to the forwarding STA own MAC address (diamond 630), the Forwarding STA may accumulate the received frame for example, in frame accumulator 128 (see FIG. 1) and may transmit the frame without any changes (e.g., as is) to the receiving station (text box 650). If the address are not equal the forwarding STA may not forward the frame (text box 640)

Embodiments of the invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A wireless mobile station comprising:
a receiver able to receive from a sending station via a forwarding station a data frame including a forwarding indication field having a predefined value indicating said data frame is forwarded, as is, by the forwarding station to said wireless mobile station, a first station address field including an address of said sending station, a second station address field including an address of said wireless mobile station, and a forwarding station address field including an address of said forwarding station;
a processor to exchange a content of the first station address field with a content of the second address field; and
a transmitter to send a block acknowledge (BA) frame to acknowledge receipt of said data frame to the sending station via the forwarding station, said BA frame including the forwarding indication field having said predefined value, the first station address field including the address of said wireless mobile station, the second station address field including the address of said sending station, and the forwarding station address field including the address of said forwarding station.

2. The wireless mobile station of claim 1, wherein said data frame includes a Physical layer (PHY) signal field including said forwarding indication field, and a media-access-control (MAC) header including said first, second and forwarding address fields.

3. The wireless mobile station of claim 1, wherein the forwarding indication field comprises a bit, —and wherein said predefined value comprises a bit value of "1".

4. The wireless mobile station of claim 1 comprising:
a Multiple-Input-Multiple-Output (MIMO) transmitter receiver system wherein said MIMO transmitter receiver system includes at least said transmitter and said receiver.

5. The wireless mobile station of claim 1, wherein the receiver is able to receive an other frame directly from the sending station and to identify the other frame as a duplicate frame if a sequence number and a packet number in the other frame are the same as a sequence number and a packet number in the data frame.

6. The wireless communication device of claim 5, wherein the processor is able to delete the duplicate frame.

7. A wireless mobile station comprising:
a transceiver able to receive from a sending station and to forward, as is, to a receiving station a data frame including a forwarding indication (F) field having a predefined value indicating said data frame is to be forwarded, as is, by said wireless mobile station to said receiving station, a sending station address field, a receiving station address field including an address of said receiving station, and a forwarding station address field; and
a processor to decide whether or not to forward the data frame to the receiving station based on a content of the F field and a comparison between a content of the forwarding station address field and an address of said wireless mobile station,
wherein said transceiver is to communicate an acknowledge frame to acknowledge receipt of said data frame by said receiving station, said acknowledge frame including the F field having said predefined value, the sending station address field including the address of said receiving station, the receiving station address field including an address of said sending station, and the forwarding station address field including the address of said wireless mobile station.

8. The wireless mobile station of claim 7, comprising:
an accumulator to accumulate the data frame based on the decision of said processor whether or not to forward the data frame to the receiving station.

9. The wireless mobile station of claim 7, comprising:
a Multiple-Input-Multiple-Output (MIMO) transceiver system wherein, said MIMO transceiver system includes at least said transceiver.

10. A wireless communication system comprising:
at least one wireless mobile station including:
one or more antennas; and
a transceiver to communicate a data frame including a forwarding indication field having a predefined value indicating said data frame is forwarded, as is, by a forwarding station, a first station address field including an address of a sending station, a second station address field including an address of a receiving station and a forwarding station address field including an address of the forwarding station; and to communicate a block acknowledge (BA) frame to acknowledge receipt of said data frame by the receiving station, said BA frame including the forwarding indication field having said predefined value, the first station address field including the address of said receiving station, the second station address field including the address of said sending station, and the forwarding station address field including the address of said forwarding station.

11. The wireless communication system of claim 10, wherein said wireless mobile station comprises said sending station, wherein said transceiver is to transmit said data frame to the receiving station via the forwarding station, and to receive said BA frame from said forwarding station.

12. The wireless communication system of claim 10, wherein said wireless mobile station comprises said forwarding station, and wherein said transceiver is to receive said data frame from said sending station, to forward said data frame to said receiving station, without changing said data frame, to receive said BA frame from said receiving station, and to forward said BA frame to said sending station.

13. The wireless communication system of claim 10, wherein the forwarding indication field comprises a bit, and wherein said predefined value comprises wherein a bit value of "1".

14. The wireless communication system of claim 10, wherein said wireless mobile station comprises said receiving station, wherein said transceiver is to receive said data frame from said forwarding station, and to transmit said BA frame to the sending station via the forwarding station.

15. The communication system of claim 10, wherein said data frame comprises an aggregate medium access control (MAC) protocol data unit (A-MPDU).

16. A method of forwarding a frame in a wireless personal network, the method comprising:
  receiving by a receiving station from a sending station via a forwarding station a data frame including a forwarding indication field having a predefined value indicating said data frame is forwarded to said receiving station, as is, by the forwarding station, a first station address field including an address of said sending station, a second station address field including an address of said receiving station, and a forwarding station address field including an address of said forwarding station;
  exchanging a content of the first station address field with a content of the second address field; and
  transmitting a block acknowledge (BA) frame to the sending station via the forwarding station to acknowledge receipt of said data frame by the receiving station, said BA frame including the forwarding indication field having said predefined value, the first station address field including the address of said receiving station, the second station address field including the address of said sending station, and the forwarding station address field including the address of said forwarding station.

17. The method of claim 16 comprising:
  receiving an other frame directly from the sending station;
  identifying the other frame as a duplicate frame if a sequence number and a packet number of the other frame are the same as a sequence number and a packet number of the data frame.

18. The method of claim 17 comprising:
  deleting the duplicate frame.

19. A processor comprising:
  a computer readable storage medium, having stored thereon instructions, that when executed, result in:
  receiving by a receiving station from a sending station via a forwarding station a data frame including a forwarding indication field having a predefined value indicating said data frame is forwarded to said wireless mobile station, as is, by the forwarding station, a first station address field including an address of said sending station, a second station address field including an address of said receiving station, and a forwarding station address field including an address of said forwarding station;
  exchanging a content of the first station address field with a content of the second address field; and
  transmitting a block acknowledge (BA) frame to the sending station via the forwarding station to acknowledge receipt of said data frame by the receiving station, said BA frame including the forwarding indication field having said predefined value, the first station address field including the address of said receiving station, the second station address field including the address of said sending station, and the forwarding station address field including the address of said forwarding station.

20. The processor of claim 19, wherein the instructions when executed result in:
  receiving another frame directly from the sending station;
  identifying the other frame as a duplicate frame if a sequence number and a packet number of the other frame are the same as a sequence number and a packet number of the data frame.

21. The processor of claim 20, wherein the instructions when executed result in deleting the duplicate frame.

* * * * *

UNITED STATES PATENT AND TRADEMARK OFFICE
CERTIFICATE OF CORRECTION

PATENT NO. : 8,537,795 B2  
APPLICATION NO. : 12/566287  
DATED : September 17, 2013  
INVENTOR(S) : Trainin Page 1 of 1

It is certified that error appears in the above-identified patent and that said Letters Patent is hereby corrected as shown below:

In the Drawings

On sheet 1 of 3, in Figure 1, Reference Numeral 128, line 1-2,
delete "FRAMS ACCUMOLATOR" and insert -- FRAMES ACCUMULATOR --, therefor.

In the Claims

Column 7, line 66, in claim 3, delete "bit, -and" and insert -- bit, and --, therefor.

Column 8, line 12, in claim 6, delete "The wireless communication device of claim 5" and insert -- The wireless mobile station of claim 5 --, therefor.

Column 9, line 12, in claim 13, after "comprises" delete "wherein".

Signed and Sealed this
Eighteenth Day of February, 2014

Michelle K. Lee
*Deputy Director of the United States Patent and Trademark Office*